A. M. GASS.
Animal-Traps.
No. 150,682.                                  Patented May 12, 1874.
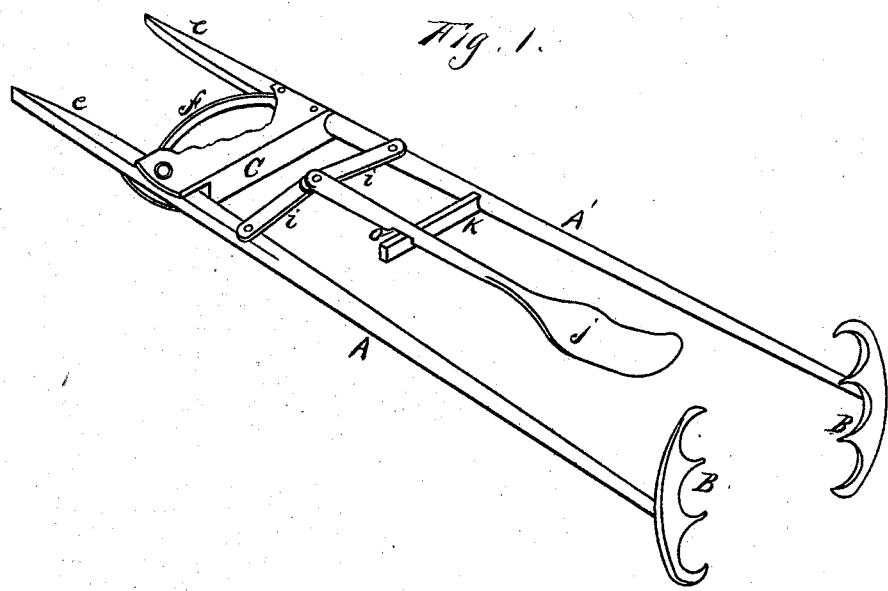
Witnesses.                    Inventor
John L. Boone              Augustus M. Gass
C. Milton Richardson       by Dewey & Co.
                                    Atty's.

UNITED STATES PATENT OFFICE.

AUGUSTUS M. GASS, OF CAMPO, CALIFORNIA.

IMPROVEMENT IN ANIMAL-TRAPS.

Specification forming part of Letters Patent No. 150,682, dated May 12, 1874; application filed January 20, 1874.

*To all whom it may concern:*

Be it known that I, A. M. GASS, of Campo, San Diego county, State of California, have invented an Improved Gopher-Trap; and I do hereby declare the following description and accompanying drawings are sufficient to enable any person skilled in the art or science to which it most nearly appertains to make and use my said invention or improvement without further invention or experiment.

My invention relates to an improvement in that class of gopher-traps in which two arms, each of which is provided with a claw at one end, are hinged together at some point near their rear end, so that a spring can be applied to force the two claws together when the trigger or set is sprung.

My improvement consists in the construction and arrangement of the trigger which is employed to set and operate the claw-arms.

In the drawings, Figure 1 is a perspective view.

A A' are two arms, each of which has a claw, B, at one end. C is a cross-bar, to each end of which one of the arms A A' may be pivoted or hinged, or one of the arms can be secured firmly to one end of the bar, as shown in the present instance, while the other is hinged or pivoted to the opposite end. This cross-bar is applied near the ends of the arms, opposite the claws, so that the extension or projecting portions e e form handles, as shown. A spring, f, is applied between the arms A A' back of the pivoted or hinged point, and serves to press the opposite or claw ends together with the required force. To set the trap I employ toggle-arms i i, the outer ends of which are pivoted to the arms A A' just in front of the cross-bar C, so that the middle joint of the toggle will be midway between the arms A A'. To the middle joint of the toggle-arms I secure one end of a spade or trigger, j. This spade or trigger extends forward between the arms A A' toward the claws, and has on its under side a notch, o. A fixed arm, K, extends out from one of the arms A A' between the toggle and claws, over which the notch o will catch when the arms are separated. By pressing the handles e e together, the opposite ends of the arms A A' are separated. The spreading of the arms also straightens the toggle and moves the trigger or spade forward, so that the notch catches over the fixed arm K. The trap as now set is placed in the hole or burrow of the animal, so that when it attempts to come out, either with its load of dirt or otherwise, it will disturb the trigger and spring the trap. I have discovered that it is the habit of the gopher to always attempt to raise any obstacle which may be placed in its way; hence I have designed my trigger to meet this peculiarity. My improved trigger arrangement is simple, cheap, and effective.

Having thus described my invention, what I claim, and desire to secure by Letters Patent, is—

The spring-arms A A', with their claws B, in combination with the toggle-arms i i, spade or trigger j, with its notch o, and the fixed arm K, all combined and arranged to operate substantially as and for the purpose above described.

In witness whereof I hereunto set my hand and seal.

AUGUSTUS M. GASS. [L. S.]

Witnesses:
JOHN B. NEWCOMB,
DANL. W. DE WITT.